United States Patent [19]
Fontana et al.

[11] Patent Number: 5,124,407
[45] Date of Patent: Jun. 23, 1992

[54] CROSSLINKABLE COMPOSITIONS COMPRISING CYCLIC POLYCARBONATES AND GLYCIDYL GROUP-CONTAINING COPOLYMERS

[75] Inventors: Luca P. Fontana, Evansville, Ind.; Sterling B. Brown, Schenectady, N.Y.

[73] Assignee: General Electric Company, Schenectady, N.Y.

[21] Appl. No.: 654,705

[22] Filed: Feb. 13, 1991

Related U.S. Application Data

[60] Continuation-in-part of Ser. No. 443,455, Nov. 30, 1989, abandoned, which is a division of Ser. No. 214,965, Jul. 5, 1988, Pat. No. 4,916,189.

[51] Int. Cl.$^5$ .................... C08L 69/00; C08L 37/00
[52] U.S. Cl. .................... 525/133; 525/148; 525/186; 525/327.3
[58] Field of Search ............. 525/133, 148, 186, 327.3

[56] References Cited

U.S. PATENT DOCUMENTS

| | | | |
|---|---|---|---|
| 3,098,056 | 7/1963 | Schnell et al. | 525/463 |
| 3,261,808 | 7/1966 | Schnell et al. | 528/88 |
| 3,761,440 | 9/1973 | Margotte | 525/148 |
| 4,701,519 | 10/1987 | Evans et al. | 525/462 |
| 4,746,725 | 5/1988 | Evans et al. | 525/370 |
| 4,916,189 | 4/1990 | Fontana | 525/186 |

FOREIGN PATENT DOCUMENTS

| | | | |
|---|---|---|---|
| 3311517 | 10/1984 | Fed. Rep. of Germany | |
| 202318 | 12/1982 | Japan | |
| 201842 | 11/1983 | Japan | 525/148 |

OTHER PUBLICATIONS

Journal of Paint Technology, Yoshino et al., vol. 44, No. 564, Jan. 1972, "Preparation of Reactive Polymers From Glycidyl Methacrylate and Their Reactivities", pp. 116–123.

Reactive Monomers, Blemmer G—"Versatile Polymer Modifier", Nippon Oil & Fats Co., Ltd., (appears to be product brochure, date unknown), pp. 1, 2, 20–21.

*Primary Examiner*—James J. Seidleck
*Assistant Examiner*—David Buttner
*Attorney, Agent, or Firm*—William H. Pittman; James C. Davis, Jr.

[57] ABSTRACT

An improved method for the preparation of crosslinked polycarbonates comprises the reaction at elevated temperature of a composition containing cyclic polycarbonate oligomers with at least one polyglycidyl acrylate copolymer formed by the reaction of at least one olefinic compound with a glycidyl acrylate monomer. Further disclosed are network polycarbonates wherein the carbonate chains are linked to each other via polyglycidyl acrylate copolymer groups, and prepreg compositions which comprise a filler and a mixture of cyclic polycarbonate oligomers with a polyglycidyl acrylate copolymer.

15 Claims, No Drawings

CROSSLINKABLE COMPOSITIONS COMPRISING CYCLIC POLYCARBONATES AND GLYCIDYL GROUP-CONTAINING COPOLYMERS

This application is a continuation-in-part of copending application Ser. No. 07/443,455 filed Nov. 30, 1989, now abandoned which in turn is a division of application Ser. No. 07/214,965, filed Jul. 5, 1988, U.S. Pat. No. 4,916,189.

This invention relates to polymer compositions and their preparation, and more particularly to the preparation of crosslinked polycarbonates.

Polycarbonates are a class of well known commercially available thermoplastic materials possessing physical and chemical properties which are useful in a wide variety of applications. Some of the notable attributes of polycarbonates include high impact strength and thermal stability, along with good transparency. However, the use of polycarbonates in some applications, e.g., automotive, is limited somewhat because of their relatively poor resistance to various organic solvents and other chemicals. Furthermore, glass transition and heat distortion temperatures for some of the conventional polycarbonates are not high enough to permit reasonable molding cycle times.

One method for correcting these deficiencies involves crosslinking the polycarbonate chains to form thermoset compositions. For example, U.S. Pat. No. 3,098,056 describes the reaction of epoxy resins with linear polycarbonates and hardeners, while U.S. Pat. No. 3,261,808 describes the preparation and cure of polycarbonates containing epoxy end groups. While polycarbonates crosslinked in this manner have better properties than those of polycarbonate alone, these methods may not be suitable for use in some of the more advanced molding techniques. For example, the high melt viscosities of linear polycarbonates make these methods unsuitable for use under reactive processing conditions such as reaction injection molding (RIM).

A recent development in the area of polycarbonates involves cyclic polycarbonate compositions. The preparation and use of cyclic polycarbonates have been previously disclosed in numerous patents, exemplified by U.S. Pat. No. 4,644,053. As described in this and in other references, cyclic polycarbonate oligomer mixtures have low viscosities and can be simultaneously polymerized and molded upon the application of heat.

Thermoset compositions prepared by reacting cyclic polycarbonate oligomers with polyepoxy compounds are described in U.S. Pat. No. 4,746,725. Although various polyepoxides are described in that application, the material of choice is either a triglycidyl isocyanurate or a bisepoxy-terminated bisphenol A-epichlorohydrin condensate. While these materials are suitable for a wide variety of applications, there is continuing interest in developing crosslinked polycarbonates which are thermally stable at high processing temperatures, e.g., above about 280° C.

It is therefore a primary objective of the present invention to provide an improved method for the preparation of highly crosslinked polycarbonates.

It is another objective of this invention to provide a method for preparing crosslinked polycarbonates which are stable at high processing temperatures.

It is a further objective of the present invention to provide a crosslinked polycarbonate preparation method which is amenable to reactive processing conditions such as reaction injection molding.

One aspect of the present invention is an improved method for the preparation of crosslinked polycarbonates, comprising the reaction at elevated temperature of a composition containing cyclic polycarbonate oligomers, a polycarbonate formation catalyst, and at least one polyglycidyl acrylate copolymer which is the reaction product of A and B, wherein A is at least one glycidyl acrylate monomer, and B is at least one olefinic compound having a reactivity such that B forms a copolymer with A. This invention also includes polycarbonate compositions which are crosslinked through glycidyl acrylate functionalities.

As mentioned above, the polyglycidyl acrylate copolymer is the reaction product of A and B. Each A unit is derived from a glycidyl acrylate monomer of the formula

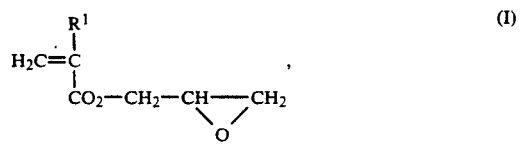

wherein $R^1$ is selected from the group consisting of hydrogen, alkyl groups containing about 1–10 carbon atoms and aromatic groups containing about 6–10 carbon atoms. Exemplary alkyl groups suitable for R1 are methyl, ethyl, propyl and isobutyl, while exemplary aromatic groups suitable for $R^1$ include phenyl, tolyl, naphthyl, xylyl and the like. Methyl (i.e., glycidyl methacrylate) is the most preferred. "Acrylate" as used herein refers to any of the acrylic acid-based groups included in formula I, unless otherwise indicated.

Each B unit in this copolymer is derived from an olefinic compound having a reactivity such that B forms a copolymer with A. In terms of overall process efficiency, compounds or combinations of compounds which provide the highest percentage of copolymer with the glycidyl acrylate monomer are preferred.

Reactivities for the glycidyl acrylates of formula I and for many olefinic compounds used to form the B units have been established. For example, when A is derived from glycidyl methacrylate (GMA), compounds for B which have reactivities suitable for copolymer formation include styrene, acrylonitrile, methyl methacrylate, ethyl methacrylate, butyl acrylate and ethyl acrylate.

For A units other than glycidyl methacrylate and for B units other than the compounds specifically mentioned herein, relative reactivities can be established through simple experimentation by those of ordinary skill in the art, if such values are not readily found in the literature. For example, the monomers in question might be mixed together under reactive conditions, followed by an analysis of the product (monomer, homopolymer and copolymer content) by well known analytical techniques, such as solvent extraction of each component, gel permeation chromatography (i.e., separation based on differing molecular weights), infrared spectroscopy, nuclear magnetic resonance spectroscopy (NMR) and the like.

Exemplary copolymer compositions useful for this invention are those formed by the reaction of glycidyl methacrylate with styrene and glycidyl methacrylate with methyl methacrylate. Exemplary terpolymer compositions are those formed by the reaction of glycidyl methacrylate with styrene and acrylonitrile; glycidyl methacrylate with methyl methacrylate and acrylonitrile; and glycidyl methacrylate with styrene and methyl methacrylate.

A useful description of the preparation of polymers and copolymers from glycidyl methacrylate is provided by M. Yoshino et al. in *Journal of Paint Technology*, 44, 116-123 (1972). Furthermore, many copolymers suitable for the present invention are commercially available from several sources, including Nippon Oil and Fats Company, Ltd., under the name "Blemmer G" resins. Some of these copolymers are described, for example, in *Blemmer G—Versatile Polymer Modified*, Revised Edition, Nippon Oil and Fats Company, Ltd., Oil and Fat Products and Chemicals Division.

In preferred embodiments, less than about 50% of the total molecular units in the polyglycidyl acrylate copolymer are A units, since the presence of a greater amount of glycidyl groups can sometimes adversely affect copolymer stability. In particularly preferred embodiments, 20-40% of the total molecular units in the polyglycidyl acrylate copolymer are A units.

The relative amounts of B units in the copolymer depend on the particular properties desired for the final product. An exemplary copolymer composition contains about 25 to 40 mole percent glycidyl methacrylate and about 40 to 75 mole percent styrene. Another exemplary composition contains about 30 to 40 mole percent glycidyl methacrylate, about 40 to 65 mole percent styrene and about 5 to 20 mole percent acrylonitrile. Those of ordinary skill in the art will be able to select particular monomers and monomer ratios to satisfy desired end use requirements without undue experimentation.

The polyglycidyl acrylate copolymers employed in the present invention are random copolymers, i.e., the comonomers are substantially random in their distribution throughout the polymer chain. Such copolymers may still contain small blocks of homopolymers in the polymer structure in amounts which do not adversely or substantially affect the unique properties of the copolymers. These properties include high reactivity and excellent thermal stability in comparison to some of the other conventional epoxy materials such as triglycidyl isocyanurate or the diglycidyl ethers of bisphenols (e.g., of bisphenol A). The high reactivity generally results in faster and more complete crosslinking of the polycarbonate (as described below), while the thermal stability characteristic results in greater part integrity during and after high temperature molding operations.

As mentioned above, the polyglycidyl acrylate copolymer is reacted with a composition comprising mixtures of cyclic polycarbonate oligomers according to this invention. Such oligomers are generally characterized by varying degrees of polymerization and comprise structural units of the formula

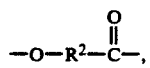

(II)

wherein each $R^2$ is independently a divalent aliphatic, alicyclic or aromatic group. These oligomers are generally well known in the art and described, for example, in the following U.S. patents, all of which are incorporated herein by reference.

| | |
|---|---|
| 4,740,583 | 4,644,053 |
| 4,701,519 | 4,605,731. |

The various $R^2$ groups in the cyclic polycarbonate oligomer mixtures (sometimes referred to herein as "cyclics" or "cyclics mixture") of this invention may be different but are usually the same and may be aliphatic, alicyclic, aromatic or mixed. Those which are aliphatic or alicyclic generally contain up to about 8 carbon atoms. Illustrative $R^2$ groups are ethylene, propylene, trimethylene, tetramethylene, hexamethylene, dodecamethylene, 1,4-(2-butenylene), 1,10-(2-ethyldecylene), 1,3-cyclopentylene, 1,3-cyclohexylene, 1,4-cyclohexylene, m-phenylene, p-phenylene, 4,4'-biphenylene, 2,2-bis(4-phenylene)propane, benzene-1,4-dimethylene and similar groups such as those which correspond to the dihydroxy compounds disclosed by name or formula (generic or specific) in U.S. Pat. No. 4,217,438, the disclosure of which is incorporated by reference herein. Also included are groups containing non-hydrocarbon moieties. These may be substituents such as chloro, nitro, alkoxy and the like and also linking radicals such as thio, sulfoxy, sulfone, ester, amide, ether and carbonyl. Most often, however, all $R^2$ groups are hydrocarbon groups.

Preferably at least about 60%, and more preferably at least about 80%, of the total number of $R^2$ groups in the cyclic oligomer mixtures, and most desirably all of said $R^2$ groups, are aromatic. The aromatic Rz groups preferably have the formula

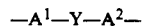

wherein each of $A^1$ and $A^2$ is a single-ring divalent aromatic group and Y is a bridging group in which one or two atoms separate $A^1$ from $A^2$. The free valence bonds in formula III are usually in the meta or para positions of $A^1$ and $A^2$ in relation to Y. Such $R^2$ groups may be considered as being derived from bisphenols of the formula

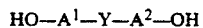

In formulas III and IV, the $A^1$ and $A^2$ groups may be unsubstituted phenylene or substituted derivatives thereof. Exemplary substituents are alkyl, alkenyl, halo (especially chloro and/or bromo), nitro, alkoxy and the like. In preferred embodiments, both Al and A2 are preferably p-phenylene.

The bridging group, Y, is one in which one or two atoms, preferably one, separate $A^1$ from $A^2$. It is most often a hydrocarbon group and particularly a saturated group such as methylene, cyclohexylmethylene, 2-[2.2.1]bicycloheptylmethylene, ethylene, isopropylidene, neopentylidene and the like. Unsaturated groups and groups containing atoms other than carbon and hydrogen might be used also, such as 2,2-dichloroethylidene, carbonyl, thio and sulfone.

Other exemplary $R^2$ groups are those derived from dihydroxy compounds such as ethylene glycol, propylene glycol, resorcinol, hydroquinone, 2,2-bis(3,5-dibromo-4-hydroxyphenyl)propane, bis(4-hydroxyphenyl) ether, bis(4-hydroxyphenyl) sulfone and 6,6'-dihydroxy-3,3,3',3'-tetramethylspiro(bis)indane ("spirobiindane bisphenol"). Based on various considerations such as availability and particular suitability for this invention, the preferred group of formula III is the 2,2-bis(4-phenylene)propane radical, which is derived from bisphenol A.

The cyclic oligomer mixtures usually comprise oligomers having degrees of polymerization of from 2 to about 30, and preferably to about 20. The mixtures usually contain very low proportions of linear oligomers, generally no more than about 10% by weight and most often less than about 5% by weight. The mixtures may also contain low percentages (usually less than 30% by weight and preferably no greater than about 10% by weight) of linear or cyclic polymers having a degree of polymerization greater than about 30.

The particular method of preparing the cyclic polycarbonates is not critical to the present invention; various methods are well known in the art. One example is a condensation reaction involving at least one bishaloformate having the formula

$$R^2(OCOX)_2 \quad (V)$$

wherein $R^2$ is as defined above and X is chlorine or bromine. The condensation reaction usually takes place interfacially when a solution of the bishaloformate in a substantially nonpolar organic liquid is contacted with a tertiary amine such as triethylamine and an aqueous alkali metal hydroxide solution.

The relative amounts of cyclic polycarbonate oligomers and polyglycidyl acrylate copolymer employed in the present invention depends in part on the amount of crosslinking desired in the polycarbonate. In preferred embodiments, an amount of copolymer corresponding to at least 8 mole percent of glycidyl groups, based on the number of carbonate units in the cyclic polycarbonate oligomer composition, is used, it being understood that each glycidyl group contains one epoxide group. A preferred upper limit for glycidyl group content is about 25 mole percent, since in some instances a higher epoxy content could result in very brittle polycarbonates. An especially preferred epoxy level is about 12 mole percent to about 15 mole percent of glycidyl groups.

As mentioned above, a polycarbonate formation catalyst is used to ring-open the cyclic polycarbonate oligomers. When used, these catalysts also appear to initiate ring-opening of the epoxide groups in the polyglycidyl acrylate. The ring-opened epoxides then react with the polycarbonate to form a crosslinked thermoset material.

Polycarbonate formation catalysts are known in the art and are usually various bases and Lewis acids with bases being preferred for this invention. Some of the polycarbonate formation catalysts useful for this invention are those employed to prepare polycarbonates by the interfacial method and by other techniques as described in U.S. Pat. Nos. 3,155,683, 3,274,214, 4,217,438 and 4,368,315, each of which is incorporated herein by reference. Examples of such catalysts are lithium phenoxide, lithium 2,2,2-trifluoroethoxide, n-butyllithium and tetramethylammonium hydroxide. Also useful are various basic salts such as sodium benzoate and lithium stearate.

A class of bases which is particularly useful under many conditions is described in U.S. Pat. No. 4,605,731. It comprises numerous tetraarylborate salts, including lithium tetraphenylborate, sodium tetraphenylborate, sodium bis(2,2'-biphenylene)borate, potassium tetraphenylborate, tetramethylammonium tetraphenylborate, tetra-n-butylammonium tetraphenylborate, tetramethylphosphonium tetraphenylborate, tetra-n-butylphosphonium tetraphenylborate and tetraphenylphosphonium tetraphenylborate. The preferred catalysts within this class are the tetra-n-alkylammonium and tetra-n-alkylphosphonium tetraphenylborates. Tetra-n-butylammonium tetraphenylborate is particularly preferred because of its high activity, relatively low cost and ease of preparation from tetra-n-butylammonium hydroxide and an alkali metal tetraphenylborate.

Another class of particularly useful basic catalysts is disclosed in U.S. Pat. No. 4,701,519, the disclosure of which is also incorporated by reference herein. It comprises polymers containing alkali metal phenoxide moieties, especially lithium phenoxide moieties. The moieties are usually present as end groups on the polymer chain, although they can also be present as substituents on the chain. The preferred polymers for these catalysts are polycarbonates, especially linear polycarbonates having a number average molecular weight in the range of about 8,000–20,000, as determined by gel permeation chromatography relative to polystyrene. Such catalysts may be produced by reacting a suitable polymer with an alkali metal base, typically at a temperature in the range of about 200–300° C.

Lewis acids which may be used as polycarbonate formation catalysts are usually selected from non-halide compounds and include dioctyltin oxide, triethanolaminetitanium isopropoxide, tetra(2-ethylhexyl) titanate and polyvalent metal (especially titanium, nickel, zinc, tin and aluminum) chelates such as bisisopropoxytitanium bisacetylacetonate (commercially available under the tradename "Tyzor AA") and the bisisopropoxyaluminum salt of ethyl acetoacetate.

For most purposes, the preferred polycarbonate formation catalyst for this invention is a lithium phenoxide-terminated polycarbonate or tetra-n-butylammonium tetraphenylborate.

An effective amount of polycarbonate formation catalyst employed is usually about 0.001–0.5 mole percent and preferably about 0.05–0.25 mole percent, based on the total number of carbonate units present in the oligomer composition.

In some embodiments, the cyclics mixture, polyglycidyl acrylate copolymer and polycarbonate formation catalyst can first be mixed together to form a non-polymerized product. The components are typically dissolved in an organic solvent such as methylene chloride, followed by evaporation of the solvent and drying of the residue for about 3 hours to about 15 hours at a temperature of from about 80° C. to about 110° C. Alternatively, the components may be dissolved in solvent and then sprayed into hot water (usually about 90–100° C.), followed by filtration and drying of the precipitate.

Formation of the crosslinked polycarbonate is then effected by heating the cyclics/polyglycidyl acrylate copolymer/polycarbonate formation catalyst mixture at an elevated temperature. Suitable temperatures are usually in the range of about 200° C. to 300° C., and preferably from about 230° C. to about 275° C.

Another aspect of this invention is a composition comprising at least one cyclic polycarbonate oligomer and at least one polyglycidyl acrylate copolymer which comprises glycidyl acrylate-derived units A and olefin units B, wherein A and B are as defined above. Such compositions are capable of undergoing crosslinking as described hereinabove, especially when they also contain the aforementioned polycarbonate formation catalysts. The exact crosslinking mechanism is not fully understood, although it appears that the epoxy functionality is the main crosslinking agent, with the ester group of the polyglycidyl acrylate copolymer contributing to a small extent in crosslinking.

Some of the crosslinked polycarbonates of this invention are often additionally characterized by a very high crosslinking density and can thus be referred to as "network" polycarbonates, which have all of the desirable attributes of thermosetting polymers, such as high strength and solvent resistance, as well as excellent molded part integrity at high temperatures.

The degree of crosslinking and crosslinking density of compositions of this invention can be measured by two tests which are generally known in the art and further described below: the gel test and the swell test. A gel content of greater than about 80% after prolonged extraction of the polymerized product with methylene chloride indicates that the polycarbonate is substantially crosslinked. In preferred embodiments, the gel content is greater than 90% and in especially preferred embodiments at least 95%.

In the gel test, polymerized samples or portions of samples are placed in a woven stainless steel screen (200 mesh) and extracted with methylene chloride in a Soxhlet apparatus for 15 hours. Drying and weighing of the samples indicates the amount of insoluble (i.e., gel) material.

In the swell test, the solid product remaining from extraction in the gel test is dried, weighed and then dipped in chloroform for 15 minutes, after which the product is weighed again to determined how much chloroform has been absorbed. Low absorbance of chloroform indicates a high density polycarbonate network, while a greater absorbance of chloroform indicates a lower density polycarbonate network.

A network polycarbonate according to this invention is one having a swell test value less than about 6 times its original weight after immersion in chloroform as described below.

Compositions formed by the method of this invention may be used in the preparation of a variety of molded, extruded and cast articles. They may also be used in laminates and as lacquers, binding agents and adhesives.

The compositions are especially useful in reactive processing operations such as RIM. In such operations, two liquid streams are fed into a mold where they react to form a resinous article, as described in the above-mentioned U.S. Pat. No. 4,746,725, incorporated herein by reference. Since polycarbonate formation catalysts which are unreactive with the polyglycidyl acrylate copolymer material can be selected, a molded thermoset article can easily be prepared. For example, a heated mold can be supplied with two liquid streams, one comprising the polyglycidyl acrylate copolymer material and the other comprising the cyclic polycarbonate oligomer composition and, optionally, a polycarbonate formation catalyst as described above. Alternatively, the catalyst can be sprayed onto the mold walls or, in the case of a composite or prepreg (as mentioned below), may be applied to the filler material. Reaction then takes place in the mold to form the desired articles.

The non-polymerized compositions of this invention, i.e., the cyclic polycarbonate oligomer composition in admixture with the polyglycidyl acrylate copolymer and the polycarbonate formation catalyst, may be combined with inert filler materials to produce prepreg compositions which can then be polymerized and crosslinked to form thermosetting network polycarbonate compositions having excellent impact resistance, moisture resistance, ductility, solvent resistance and part integrity (i.e., a part's capability of retaining its exact dimensions after being exposed to high temperature and then being cooled).

Details regarding various aspects of prepreg formation and use are well known in the art and do not require an exhaustive discussion here. Exemplary techniques are described in U.S. Pat. No. 4,740,583.

Suitable fillers for the prepreg compositions include talc, quartz, wood flour, finely divided carbon, silica or mixtures thereof. Continuous fiber fillers, including carbon, glass or highly oriented polyamide or boron fibers are particularly useful.. Polymerization conditions for the prepregs are generally the same as described above. Upon polymerization, reinforced, crosslinked polycarbonate articles are obtained which have a wide range of excellent physical and chemical properties. Furthermore, the presence of the inert filler material advantageously does not affect The following specific examples describe novel embodiments of the present invention and procedures used therein. They are intended for illustrative purposes only and should not be construed as a limitation upon the broadest aspects of the invention. All parts, percentages and ratios are by weight, unless otherwise indicated.

EXAMPLE 1

This example describes one method of preparation of a crosslinked polycarbonate composition according to the present invention. A bisphenol A-derived cyclic polycarbonate mixture (4.5 grams, 0.018 mole), 50 grams of Blemmer ® G CP50S, which is a polyglycidyl methacrylate/styrene copolymer ((50% by weight styrene), and tetrabutylammonium tetraphenylborate (0.025 gram, 0.044 millimole) were dissolved in methylene chloride. The solvent was evaporated and the residue was then dried in a vacuum oven for 15 hours at 80° C.

Polymerization of the sample was then carried out on a 0.5 gram scale in test tubes under a nitrogen atmosphere at about 250° C. to 300° C. for 15 minutes.

An "in mold" polymerization was performed using a one inch closed circular mold at 275° C.–280° C. (pressure of about 4000–6000 pounds) over the course of 15 minutes.

EXAMPLE 2

A bisphenol A-based cyclic polycarbonate oligomer mixture was mixed with various polyglycidyl methacrylate copolymers according to the carbonate/glycidyl methacrylate ratios listed in Table 1. The glycidyl methacrylate copolymers of Samples 1–8 fall within the scope of the present invention and were Blemmer G products of Nippon Oil and Fats Company, Ltd. The glycidyl methacrylate homopolymer of Sample 9 was obtained from Polyscience Company. Sample 10 utilized triglycidyl isocyanurate (TGIC) as the crosslinking agent rather than a polyglycidyl acrylate agent of this invention.

The cyclic polycarbonate oligomer mixture contained about 25–30% by weight linear polycarbonate.

The cyclics were mixed with the indicated copolymer or homopolymer followed by polymerization for 15 minutes at 300° C., using a 0.1% by weight lithium-terminated polycarbonate formation catalyst. In addition to the gel and swell tests, each sample was visually examined to observe the development of any color or foaming that might indicate thermal instability. The results are provided in Table 1 below.

TABLE I

| Sample No. | Wt. % GMA | Wt. % Comonomer(s)[1] | Mole % of glycidyl methacrylate (or TGIC)[2] | % gel in insoluble fraction | Swell Test value |
|---|---|---|---|---|---|
| 1 | 10 | 90 (S + A) | 15 | 81 | 8 |
| 2 | 15 | 85 S | 15 | 96 | 7 |
| 3 | 20 | 80 S | 15 | 96 | 6 |
| 4 | 20 | 80 (S + A) | 15 | 96 | 6 |
| 5 | 20 | 80 (M + A) | 15 | 96 | 6 |
| 6 | 30 | 70 S | 15 | 95 | 6 |
| 7 | 50 | 50 S | 15 | 98 | 4 |
| 8 | 50 | 50 M | 15 | 97 | 4 |
| 9 | 100 | — | 15 | 95 | — |
| 10 | — | — | 10 | 88 | 8 |

[1] S = styrene
A = acrylonitrile
M = methyl methacrylate
[2] Based on the total number of moles of bisphenol A carbonate units.

The data of Example 2 demonstrate that use of the crosslinking agents of this invention generally results in a high level of crosslinking.

Although the polyglycidyl methacrylate homopolymer of sample 9 exhibited good crosslinking, it was subject to degradation, as described in Example 4 below and is thus not part of this invention.

The TGIC-based system of sample 10 (also outside the scope of this invention) did not crosslink as completely as most of the polyglycidyl methacrylate-based systems and was also found to be more susceptible to degradation at molding temperatures greater than about 280° C.

EXAMPLE 3

Various products according to this invention were prepared by mixing a cyclic polycarbonate oligomer mixture as used in Example 1 with a polyglycidyl methacrylate copolymer containing 50% by weight glycidyl methacrylate units and 50% by weight styrene units. The reaction mixture also contained 0.25 mole percent tetrabutylammonium tetraphenylborate as a polycarbonate formation catalyst. The relative percentage of polyglycidyl methacrylate was varied for each sample. The results are provided in Table II.

TABLE II

| | Sample No. | | |
|---|---|---|---|
| | 11 | 12 | 13 |
| % PGMA/Styrene Copolymer | 7 | 14 | 20 |
| % Polycarbonate | 93 | 86 | 80 |
| % Gel | 77 | 96 | 95 |
| Tg (°C.) | 149 | 158 | 158 |
| HDT (°C.) (264 psi)[1] | 131 | 145 | 146 |
| Tensile Modulus (psi)[2] | 342,000 | 366,000 | 374,000 |
| % Strain[2] | 6 | 5–6 | 4 |

[1] As measured by ASTM D648.
[2] As measured by ASTM D638.

Each of the samples exhibited acceptable tensile and strain properties. However, the data show that a proportion of polyglycidyl methacrylate copolymer greater than 7% (corresponding to 7.6 mole percent glycidyl methacrylate units, based on carbonate structural units) is generally preferable for inducing crosslinking of the polycarbonates. Furthermore, as the level of polycarbonate is decreased there is some decrease in ductility.

The high tensile modulus properties indicate good part integrity. This was confirmed by aging of the molded sample at 250° C. for 1 hour, followed by examination of the sample for any changes in its dimensions or shape.

EXAMPLE 4

This example demonstrates some of the disadvantages of using a glycidyl methacrylate homopolymer as the crosslinking agent.

Polyglycidyl methacrylate was obtained from the Polyscience Company as a solution (10% weight) in methyl ethyl ketone. A mixture of bisphenol A-derived cyclic polycarbonates (10.0 grams, 39.4 millimoles) was mixed with the solution of polyglycidyl methacrylate (5.63 grams, 0.394 millimole) and tetramethylammonium tetraphenylborate (22.1 milligrams, 0.04 millimole) in methylene chloride (50 mL.). The solvents were evaporated and the residue was dried in a vacuum oven at 110.C for 15 hours.

Attempts were made to compression-mold a disk (about one inch (2.54 cm.) in diameter, containing about 2 grams of the mixture) at a temperature of 250.C and a pressure of 4000 pounds. These attempts failed, resulting in excessive foaming and complete degradation of the material. It appears that failure was in part due to the low thermal stability of the glycidyl methacrylate homopolymer.

EXAMPLE 5

This example describes the preparation of a crosslinked polycarbonate composite article.

An eight-ply laminate containing about 70% by weight glass and 25% by weight resin (a mixture of the cyclic polycarbonate material and the polyglycidyl methacrylatestyrene copolymer used in Example 1) was compression-molded.

The mold was placed in the tool piece and the temperature was raised to 225° C. while the pressure was maintained at 50 psi. After reaching 225° C., the pressure was increased to 200 psi. These conditions were held for 15 minutes to achieve thorough impregnation of the resin into the glass fibers. While the pressure was maintained at 200 psi., the tool temperature was raised to 280° C. and held there for 10 minutes. After cooling under pressure (200 psi.), the part was removed from the mold. A gel test as described above yielded 100% insoluble material, demonstrating that the crosslinking tendency of these compositions is not adversely affected by the presence of filler materials.

Modifications and variations of the present invention might be desirable in light of the above teachings. It is, therefore, to be understood that changes may be made in the particular embodiments of the invention described herein which are within the full intended scope of the invention as defined by the appended claims.

What is claimed is:

1. A composition comprising at least one cyclic polycarbonate oligomer and at least one polyglycidyl acrylate copolymer which is the reaction product of A and B, wherein A is at least one monomer of the formula $$H_2C=C\begin{matrix}R^1\\|\\CO_2-CH_2-CH\underset{\diagdown O \diagup}{-}CH_2\end{matrix} \qquad (I)$$

and

B is at least one olefinic compound having a reactivity such that B forms a copolymer with A; and $R^1$ is selected from the group consisting of hydrogen, alkyl groups containing about 1–10 carbon atoms and aromatic groups containing about 6–20 carbon atoms.

2. A composition according to claim 1 which also contains a polycarbonate formation catalyst in an amount effective to convert said composition to a crosslinked polycarbonate upon heating.

3. A composition according to claim 2 wherein each olefinic compound is independently selected from the group consisting of acrylonitrile, styrene, alkyl methacrylates and alkyl acrylates.

4. A composition according to claim 3 wherein the olefinic compound is methyl methacrylate.

5. A composition according to claim 2 wherein the proportion of glycidyl groups is at least about 8 mole percent, based on the number of carbonate units in the oligomer composition.

6. A composition according to claim 5 wherein the proportion of glycidyl groups is about 8–25 percent, based on the number of carbonate units in the oligomer composition.

7. A composition according to claim 2 wherein the polycarbonate formation catalyst is selected from the group consisting of lithium phenoxide, lithium tetraphenylborate, sodium tetraphenylborate, potassium tetraphenylborate, tetramethylammonium tetraphenylborate, tetra-n-butylammonium tetraphenylborate, tetramethylphosphonium tetraphenylborate, tetra-n-butylphosphonium tetraphenylborate and tetraphenylphosphonium tetraphenylborate.

8. A composition according to claim 2 wherein the polycarbonate formation catalyst comprises a polymer containing alkali metal phenoxide moieties.

9. A composition according to claim 8 wherein the catalyst is a lithium phenoxide-terminated polycarbonate.

10. A composition according to claim 2 wherein less than about 50% of the total molecular units in the polyglycidyl acrylate copolymer are A units.

11. A composition according to claim 2 wherein the polycarbonate formation catalyst is present in the amount of about 0.001–0.5 mole percent, based on the number of carbonate units in the oligomer composition.

12. A composition according to claim 11 wherein the polycarbonate formation catalyst is present in the amount of about 0.05–0.25 mole percent, based on the number of carbonate units in the oligomer composition.

13. A composition according to claim 2 wherein the cyclic polycarbonate oligomers are of varying degrees of polymerization and comprise structural units of the formula

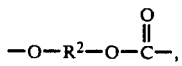

wherein each $R^2$ is independently a divalent aliphatic, alicyclic or aromatic group.

14. A composition according to claim 13 wherein each $R^2$ has the formula

wherein each of $A^1$ and $A^2$ is a single ring divalent aromatic group and Y is a bridging group in which one or two atoms separate $A^1$ from $A^2$.

15. A composition according to claim 14 wherein Y is 2,2-propylene, $A^1$ and $A^2$ are each p-phenylene and the oligomers contain up to about 20 monomer units.

* * * * *